United States Patent
Fukushima et al.

(10) Patent No.: US 7,191,583 B2
(45) Date of Patent: Mar. 20, 2007

(54) LAWN MOWER CONTROL SYSTEM

(75) Inventors: Tomoki Fukushima, Saitama (JP);
Hayato Matsuda, Saitama (JP);
Shinichi Katsuragawa, Saitama (JP);
Hiroshi Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 254 days.

(21) Appl. No.: 10/947,919

(22) Filed: Sep. 23, 2004

(65) Prior Publication Data
US 2005/0066643 A1    Mar. 31, 2005

(30) Foreign Application Priority Data

Sep. 25, 2003   (JP) .............................. 2003-333710
Sep. 25, 2003   (JP) .............................. 2003-333711

(51) Int. Cl.
*A01D 43/06* (2006.01)

(52) U.S. Cl. ..................... 56/202; 56/194; 56/10.2 R

(58) Field of Classification Search ............. 56/10.2 R, 56/10.2 G, 194, 202
See application file for complete search history.

(56) References Cited

U.S. PATENT DOCUMENTS

| 4,964,266 | A | * | 10/1990 | Kolb ........................... 56/202 |
| 5,010,866 | A | * | 4/1991 | Ohata .......................... 123/352 |
| 5,321,939 | A | * | 6/1994 | Fuse et al. ................ 56/10.2 R |
| 5,325,650 | A | * | 7/1994 | Fuse et al. ................ 56/10.2 R |
| 5,388,394 | A | * | 2/1995 | Heismann .................... 56/194 |
| 5,605,033 | A | * | 2/1997 | Olmr ....................... 56/10.2 R |
| 5,775,077 | A | * | 7/1998 | Olmr ............................ 56/202 |
| 5,832,708 | A | * | 11/1998 | Sugden ......................... 56/202 |
| 5,950,408 | A | * | 9/1999 | Schaedler ..................... 56/202 |
| 6,073,432 | A | * | 6/2000 | Schaedler ..................... 56/202 |
| 6,089,006 | A | * | 7/2000 | Langford et al. ............. 56/202 |
| 6,272,818 | B1 | * | 8/2001 | Sebben et al. ........... 56/10.2 R |
| 6,622,465 | B2 | * | 9/2003 | Jerome et al. ................ 56/203 |

FOREIGN PATENT DOCUMENTS

| JP | 05-076232 | 3/1993 |
| JP | 05-147460 | 6/1993 |

* cited by examiner

*Primary Examiner*—Patricia Engle
*Assistant Examiner*—Alicia Torres
(74) *Attorney, Agent, or Firm*—Carrier, Blackman & Associates, P.C.; Joseph P. Carrier; William D. Blackman

(57) ABSTRACT

In a control system of a lawn mower having an internal combustion engine controlled to a desired engine speed by a throttle actuator, a blade connected to the engine to be driven to cut grass, an engine output is estimated based on a detected throttle position and the desired engine speed, and when the estimated engine output exceeds a prescribed value, the grass bag is determined to be full of cut grass. With this, a full grass bag can be detected and the operator informed without providing a dedicated sensor. In addition, a blade switch that inputs a drive instruction to drive the blade and a running switch that inputs a running instruction to propel the lawn mower are provided, and the desired engine speed is set to a first speed when neither the drive instruction nor the running instruction is inputted, but is changed immediately to a second speed, set higher than the first speed, when the drive instruction is inputted, or is changed to the second speed gradually, when the running instruction is inputted, whereby fuel efficiency and operability are improved.

8 Claims, 17 Drawing Sheets

LAWN MOWER CONTROL SYSTEM

BACKGROUND OF THE INVENTION

1. Field of the Invention

The present invention relates to a lawn mower control system.

2. Description of the Related Art

Lawn mowers are commonly equipped with a grass bag, in which the grass cut by a grass-cutting blade is collected. When the grass bag is filled up with cut grass, the rotation of the blade meets with resistance and the load on the engine for driving the blade increases. Therefore, the engine speed decreases in a lawn mower wherein the engine speed is adjusted with a mechanical governor, and it is possible for the operator to know thereby that the grass bag has become full.

However, in a lawn mower equipped with a so-called electronic governor that opens and closes a throttle valve with an actuator to adjust the engine speed, the throttle opening is adjusted so as to maintain the desired speed even if the engine load increases, so the engine speed does not decrease, and therefore the operator cannot physically sense that the grass bag has become full. When the lawn mower continues to operate with a full grass bag, the engine is subjected to an excessive load, which results in the occurrence of stalls, the clogging of the space between the blade and the blade housing with cut grass, and other such drawbacks.

In view of this, a lawn mower based on the technology described in Japanese Laid-Open Patent Application No. 5-76232, for example, is configured such that an optical sensor is mounted near the opening of the grass bag, it is determined that the grass bag has become full when light is blocked by the accumulated grass near the opening, and the operator is informed by a buzzer or a lamp. The lawn mower according to Japanese Laid-Open Patent Application No. 5-76232 is a riding lawn mower.

However, providing a dedicated sensor for detecting that the grass bag is full as described above has drawbacks in that space is needed for mounting the sensor, and the cost increases. In a non-riding lawn mower requiring small size and low cost, the drawbacks are particularly significant and installing a dedicated sensor has been difficult.

Also well known is a technique whereby a grass-cutting blade is driven by a mounted engine, and the wheels are driven to allow the lawn mower to be self-propelled. When the blade and wheels are driven, the engine speed must be increased to be higher than the idling engine speed because of the increased load. However, the engine speed is adjusted manually in many conventional lawn mowers, so it has been troublesome to adjust the engine speed according to the driving of the blade or wheels. Consequently, in many cases the engine speed is continuously kept at a level above the idling speed, at which an output sufficient to drive the blade or wheels is generated, creating drawbacks such as reduced fuel efficiency and increased noise.

In view of this, the technique described, for example, in Japanese Laid-Open Patent Application No. 5-147460 (paragraph 0005, etc) has been proposed. According to this technique, a riding lawn mower is configured such that a pressure sensor detects that the rider is sitting, the transmission is brought to the forward-movement position, the engine speed is immediately increased to the maximum speed when the PTO clutch is detected to have been engaged (in other words, when grass is being cut while the lawn mower is moving), and the engine speed is maintained at idling speed when any of the above-mentioned conditions are not met.

In a non-riding lawn mower, sometimes only the blade is driven to perform the cutting operation (the wheels are not driven and the mower is pushed manually) when grass is cut over a small area and in other situations. Also, sometimes the blade is not driven and only the wheels are driven in a self-propelling mode in order to reduce the load for moving the lawn mower. However, the aforesaid prior art (5-147460) does not go so far as to separately consider the driving of the wheels and the driving of the blade and to vary the engine speed accordingly, thus leaving room for improvement in terms of operability.

Also, if the engine speed is immediately increased to the desired (maximum) speed under the right conditions, the lawn mower may suddenly accelerate and become less maneuverable, as described in the aforesaid prior art (5-147460).

SUMMARY OF THE INVENTION

Therefore, a first object of the present invention is to address the problems described above and to provide a lawn mower control system designed such that a full grass bag can be detected and the operator informed without providing a dedicated sensor, and thus the occurrence of engine stalls and other such drawbacks can be prevented in a small and inexpensive lawn mower.

A second object of the present invention is to address the problems described above and to provide a lawn mower control system designed such that the engine speed is varied with separate consideration for the driving of the wheels and the driving of the blade, whereby fuel efficiency and operability are improved, and sudden acceleration is prevented and maneuverability improved when the lawn mower enters the self-propulsion mode.

In order to achieve the first object, there is provided a system for controlling operation of a lawn mower having an internal combustion engine, a grass-cutting blade connected to the engine to be driven to cut grass and a grass bag to collect grass cut by the blade, comprising: an actuator that opens/closes a throttle valve of the engine; an engine speed controller that controls operation of the actuator such that a speed of the engine becomes a desired engine speed; a throttle-position sensor that outputs a signal indicative of a position of the throttle valve; an engine output estimator that estimates output of the engine based on the detected position of the throttle valve and the desired engine speed; a bag-full determiner that determines that the grass bag is full of cut grass when the estimated output of the engine exceeds a prescribed value; and an informing device that informs an operator when the grass bag is determined to be full.

In order to achieve the second object, there is provided a system for controlling operation of a lawn mower having an internal combustion engine, a grass-cutting blade connected to the engine to be driven to cut grass and a wheel connected to the engine to be driven to propel the lawn mower, comprising: an actuator that opens/closes a throttle valve of the engine; an engine speed controller that controls operation of the actuator such that a speed of the engine becomes a desired engine speed; a blade switch that inputs a drive instruction to drive the blade; a running switch that inputs a running instruction to propel the lawn mower; a desired engine speed changer that sets the desired engine speed to a first desired speed when neither the drive instruction nor the running instruction is inputted, changes the desired engine speed immediately to a second speed, set higher than the first speed, when the drive instruction is inputted, and changes the desired engine speed to the second speed gradually, when the running instruction is inputted.

DESCRIPTION OF THE PREFERRED EMBODIMENTS

A lawn mower control system according to an embodiment of this invention will now be explained with reference to the drawings.

The preferred embodiments for implementing the lawn mower control system according to the present invention will be described hereinafter with reference to the accompanying drawings.

Figure 1:
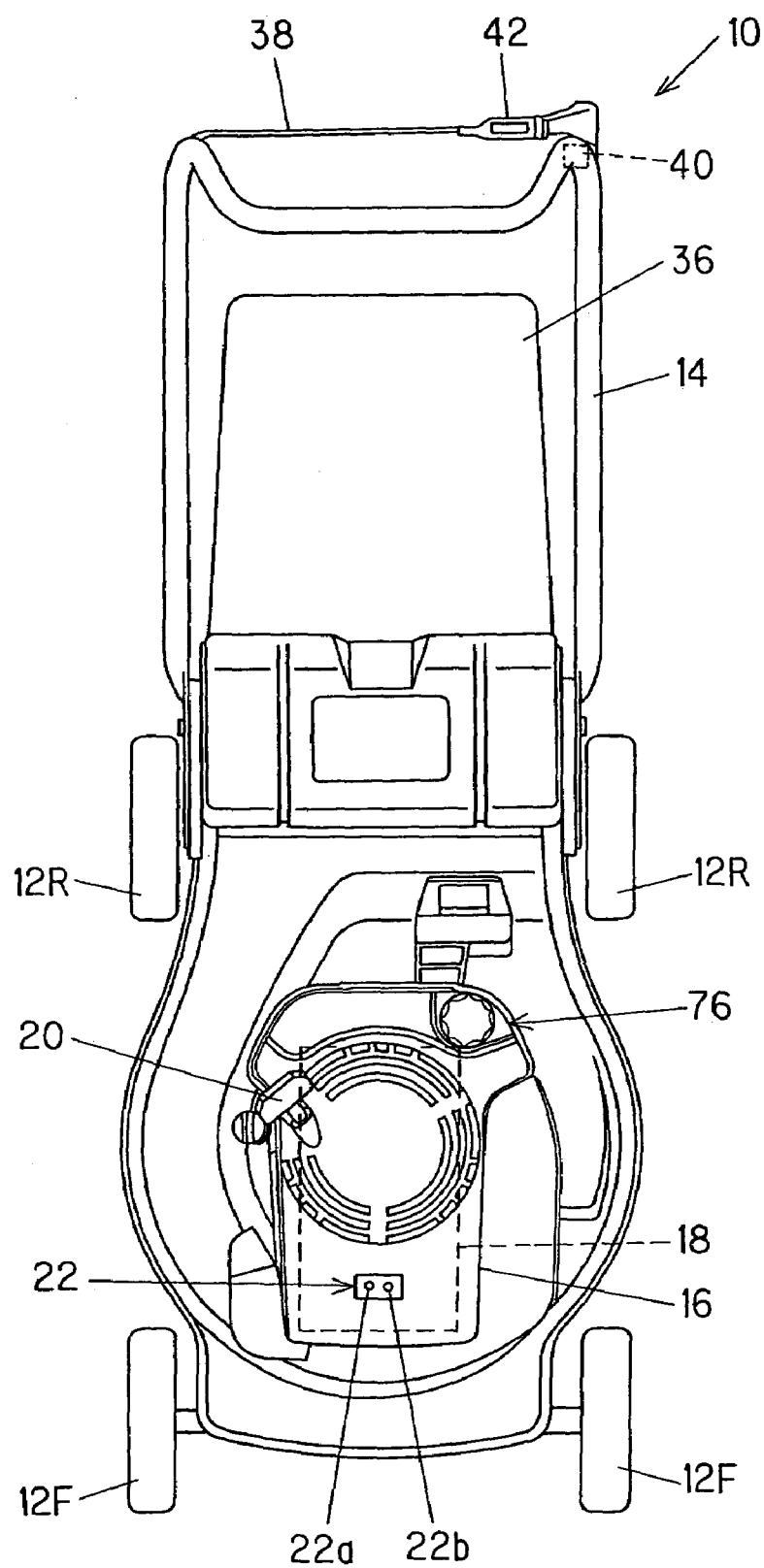
FIG. 1 is a plan view of the lawn mower to which a lawn mower control system according to the present invention is applied.
Figure 2:
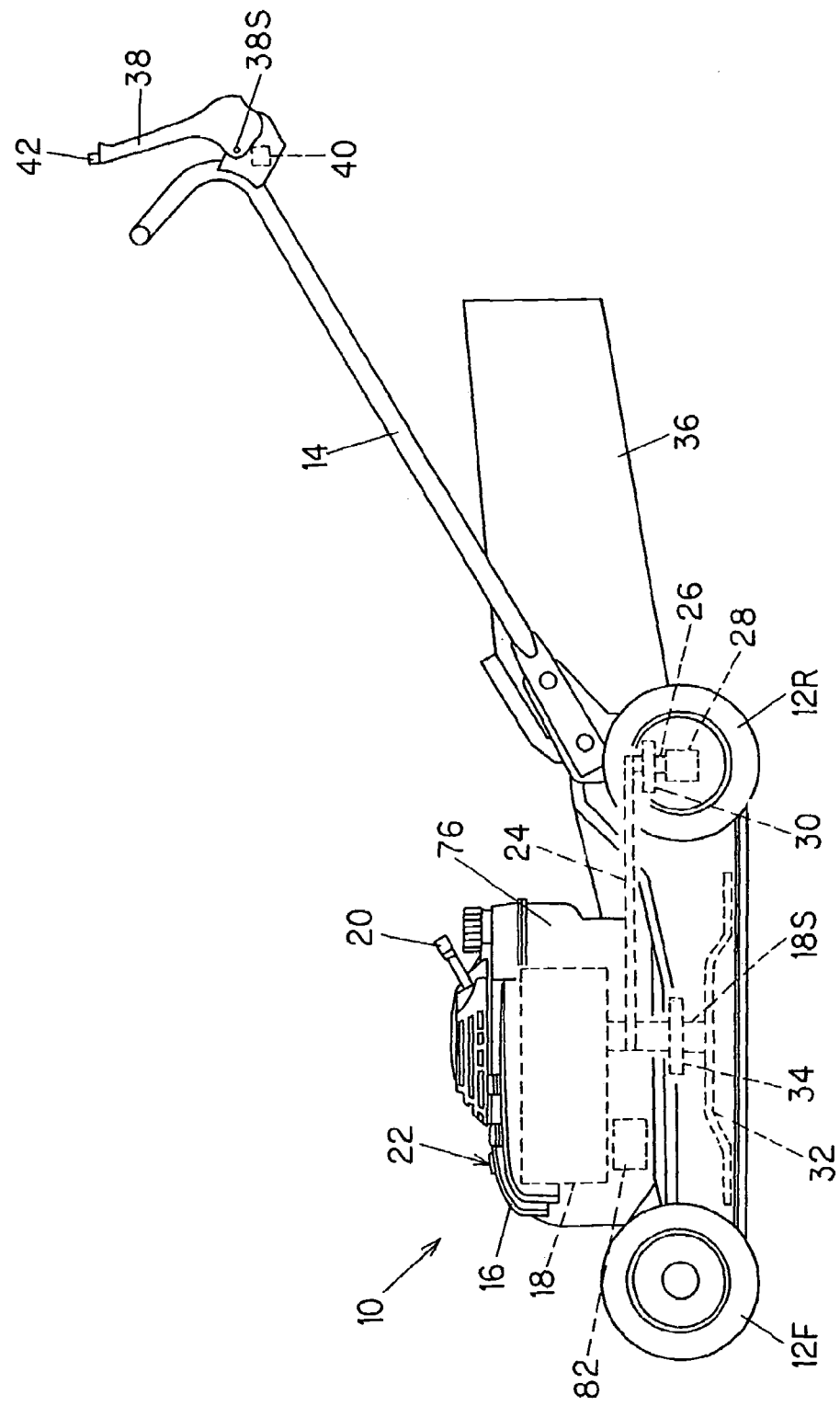
FIG. 2 is a side view of the lawn mower shown in FIG. 1.

FIG. 1 is a plan view of the lawn mower to which the lawn mower control system according to the present invention is applied. FIG. 2 is a side view of the lawn mower shown in FIG. 1.

In FIGS. 1 and 2, the symbol 10 indicates a lawn mower. The lawn mower 10 is a non-riding self-propelled lawn mower with two front wheels 12F and two rear wheels 12R, to a total of four wheels, and a handlebar 14. An engine 18 is installed inside an engine cover 16 on a frame supported by the four wheels 12F and 12R. The engine 18 includes a recoil starter 20, and is manually started up by the operator. Also, a lamp unit 22 is disposed on top of the engine cover 16. The lamp unit 22 includes a pilot lamp 22a and a bag-fill indicator lamp 22b, as shown in FIG. 1.

A crankshaft 18S of the engine 18 is connected to a rear wheel drive axle 26 via a belt 24, as shown in FIG. 2. The rear wheel drive axle 26 is connected to the rear wheels 12R via a gear mechanism 28. Also, a rear wheel electromagnetic clutch 30 is disposed in the middle of the rear wheel drive axle 26, and this clutch cuts off the transmission of engine output to the rear wheels 12R.

A grass-cutting blade 32 is mounted on the distal end of the crankshaft 18S. The blade 32 is a rotary blade with a substantially circular rotating shape when viewed in a plane. Also, a blade electromagnetic clutch 34 is disposed between the blade 32 and the belt 24 in the crankshaft 18S, and this clutch cuts off the transmission of engine output to the blade 32.

Also, a grass bag 36 is installed in the rear part of the lawn mower 10, as shown in FIGS. 1 and 2. The grass cut by the blade 32 is collected in the grass bag 36 by the action of a spiral flow resulting from the rotation of the blade 32.

Also, a running lever 38 is mounted near the distal end of the aforementioned handlebar 14. The running lever 38 can rotate around a shaft 38S (shown in FIG. 2). A running switch 40 is disposed near the shaft 38S, and the switch outputs an "on" signal when the running lever 38 is tilted forward by the operator in the direction of movement of the lawn mower 10. Also, a blade switch 42 is disposed on the running lever 38. The blade switch 42 outputs an "on" signal when pressed once by the operator, and terminates the output of the "on" signal when pressed a second time.

Figure 3:
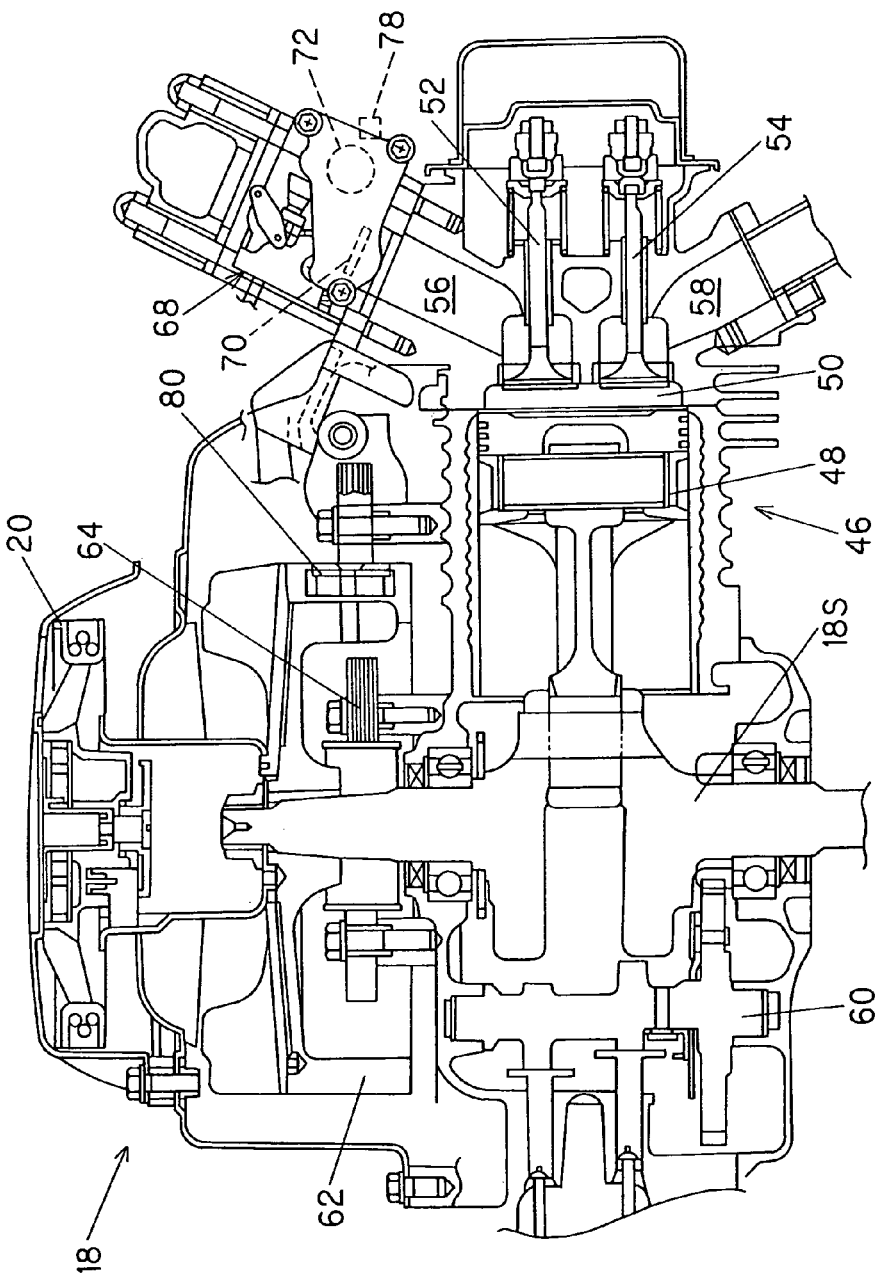
FIG. 3 is an explanatory cross-sectional view of the engine shown in FIG. 1.

FIG. 3 is an explanatory cross-sectional view of the engine 18.

The engine 18 has a cylinder 46, and a piston 48 is accommodated therein so as to be able to reciprocate. A combustion chamber 50 is formed between the head of the piston 48 and the wall of the cylinder, and an air intake valve 52 and an exhaust valve 54 are disposed in the wall of the cylinder to open and close the connection between the combustion chamber 50 and an intake passage 56 or an exhaust passage 58. The engine 18 specifically comprises an air-cooled, four-cycle, single cylinder OHV internal combustion engine, and has a volume displacement of 163 cc.

The piston 48 is coupled with the crankshaft 18S, and the crankshaft 18S is coupled with a camshaft 60 via a gear. A flywheel 62 is mounted on one end of the crankshaft 18S, and the aforementioned recoil starter 20 is mounted next to the distal end of the flywheel 62. Though omitted in the diagram, the blade 32 is mounted on the other end of the crankshaft 18S via the aforementioned blade electromagnetic clutch 34.

A power-generating coil (alternator) 64 is disposed inside the flywheel 62, and the coil generates an alternating current. The alternating current generated by the power-generating coil 64 is converted to a direct current via a processing circuit (not shown), and is then supplied as a source of operating power to an ECU (described later), an ignition circuit (not shown), or the like.

Also, a throttle body 68 is disposed upstream of the intake passage 56. A throttle valve 70 is accommodated in the throttle body 68, and the throttle valve 70 is connected to an electric motor (actuator; specifically, a stepping motor) 72 via a throttle shaft and a reducing gear mechanism (neither is shown). Also, a carburetor assembly (not shown) is provided on the upstream side of the throttle valve 70 in the throttle body 68. The carburetor assembly connects to a fuel tank (indicated by the symbol 76 in FIGS. 1 and 2) and injects gasoline fuel into the air suctioned according to the opening of the throttle valve 70 to form an air-fuel mixture. The resulting air-fuel mixture is drawn into the combustion chamber 50 of the cylinder 46 through the throttle valve 70, the intake passage 56, and the air intake valve 52.

A throttle-position sensor 78 is disposed near the electric motor 72, and the sensor outputs a signal indicative of the opening or position θTH (hereinafter referred to as "throttle opening") of the throttle valve 70. A crank angle sensor 80 composed of an electromagnetic pickup is disposed near the flywheel 62, and the sensor outputs a pulse signal in prescribed crank angle increments.

Figure 4:
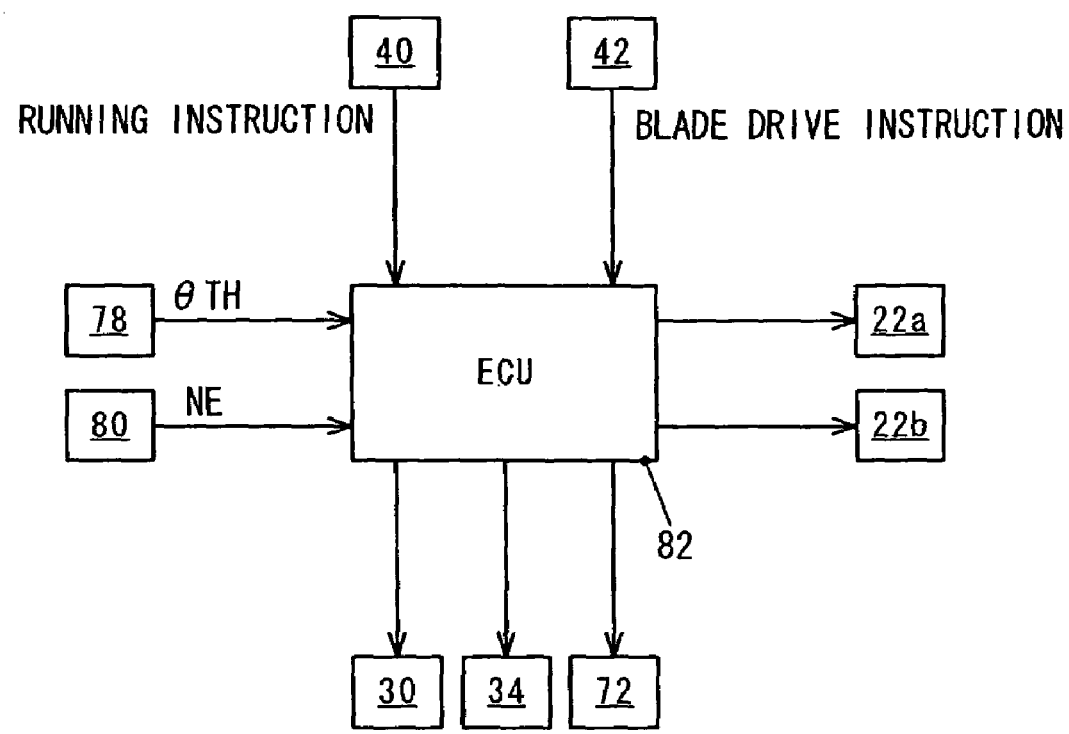
FIG. 4 is a block diagram schematically showing the control system of the lawn mower shown in FIG. 1.

FIG. 4 is a block diagram schematically showing the control system of the lawn mower 10 of the embodiment.

The outputs of the throttle-position sensor 78 and the crank angle sensor 80 are inputted to an ECU (electronic control unit) 82 as shown in FIG. 4. The ECU 82 comprises a microcomputer equipped with a CPU, ROM, RAM, and a counter, and is disposed at a suitable location on the lawn mower 10, as shown in FIG. 2.

The ECU 82 counts the output pulses of the crank angle sensor 80 and detects (calculates) the engine speed NE. The ECU 82 calculates the energization command value of the electric motor 72 on the basis of the detected engine speed NE and the throttle opening θTH such that the detected engine speed NE becomes equal to a predetermined desired speed NED, and outputs the calculated energization command value to be supplied to the electric motor 72 to control the driving thereof.

Furthermore, a running instruction ("on" signal) from the operator is inputted to the ECU 82 via the running switch 40, and a blade drive instruction ("on" signal) from the operator is also inputted via the blade switch 42. When the running instruction is inputted from the operator, the ECU 82 engages the rear wheel electromagnetic clutch 30 and transmits rotation output from the engine 18 to the rear wheels 12R, whereby the lawn mower 10 is self-propelled. Also, when the blade drive instruction is inputted from the operator, the ECU 82 engages the blade electromagnetic clutch 34 and transmits rotation output from the engine 18 to the blade 32, whereby the blade 32 is rotated (enabled to cut grass).

Thus, the control system of the lawn mower 10 according to the present embodiment is designed such that the throttle valve 70 is opened and closed by an electronically controlled throttle device (electronic governor) having a throttle body 68, an ECU 82, various sensors, and the like, and the engine speed NE is controlled to reach the desired speed NED by adjusting the air intake of the engine 18. Also, the rotation output of the engine 18 is transmitted to the rear wheels 12R via the rear wheel electromagnetic clutch 30, so that the rear wheels 12R are driven to establish a self-propelling mode, and the rotation output of the engine is transmitted to the blade 32 via the blade electromagnetic clutch 34 to drive the blade 32.

The ECU 82 lights up the pilot lamp 22a for indicating whether the lawn mower 10 is operating normally based on the various inputs, determines whether the grass bag 36 is full based on the detected throttle opening θTH and the desired engine speed NED, and lights up the bag-fill indicator lamp 22b when it is determined that the bag is full.

Figure 5:
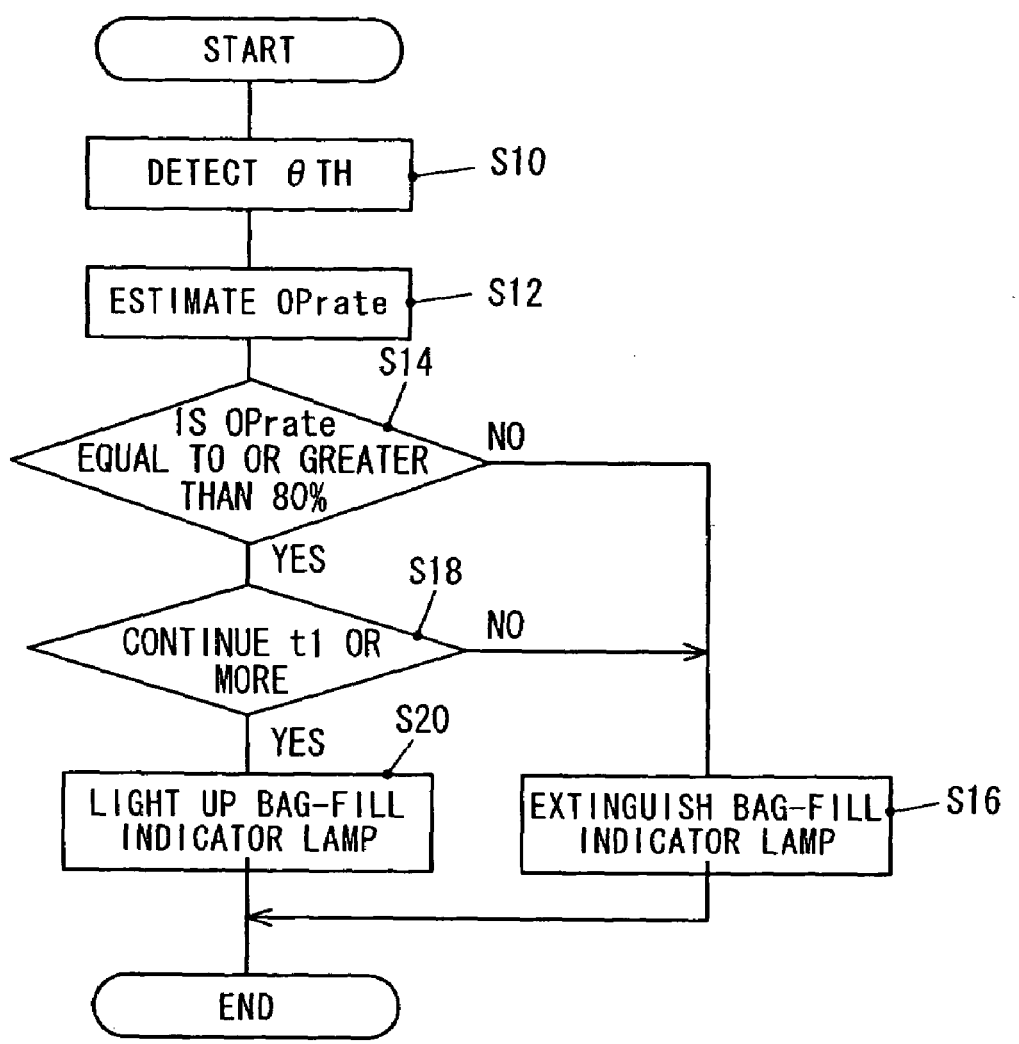
FIG. 5 is a flowchart showing the operation of the control system for detecting whether the grass bag is full in the lawn mower shown in FIG. 1.

Next, the operation of the control system for detecting whether the grass bag is full in the lawn mower according to the present embodiment will be described with reference to FIGS. 5 through 7. FIG. 5 is a flowchart showing this operation. The program shown is performed in the ECU 82 with specific periodicity (for example, 20 msec).

Before continuing the description of the flowchart in FIG. 5, a summary of this operation will first be described. As described with the conventional technology, when the grass bag 36 becomes full with cut grass, the rotation of the blade 32 that delivers grass and a spiral flow (air) to the grass bag 36 meets with resistance, and the load on the engine 18 increases. The throttle valve 70 for maintaining the desired speed NED is opened accordingly, and the output of the engine 18 increases. In view of this, the output OP of the engine 18 in the present embodiment is estimated based on the desired speed NED and the throttle opening θTH, it is determined whether the grass bag 36 is full based on the estimated engine output OP, and the bag-fill indicator lamp 22b is lit up to inform the operator when the grass bag 36 is determined to be full.

Figure 6:
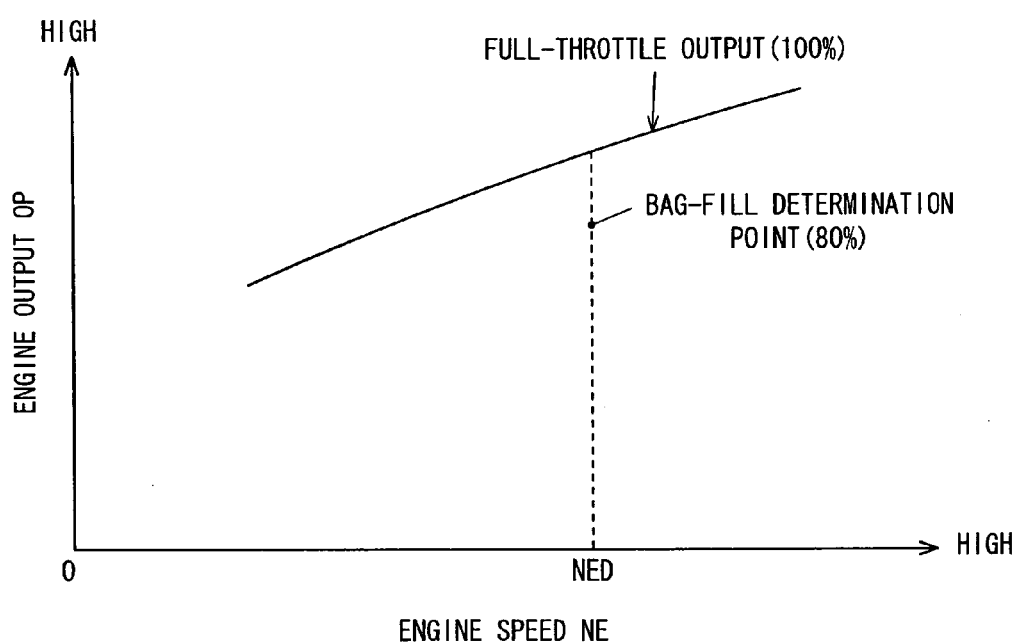
FIG. 6 is a graph showing the characteristics of the engine speed in relation to the output of the engine shown in FIG. 1.

To specifically describe the method for determining the output of the engine 18, an output that is lower by a specific proportion than the full-throttle output (100%) delivered when the engine speed NE is equal to the desired speed NED (2900 rpm in the present embodiment) is set as the bag-fill determination point, as shown in FIG. 6. In the present embodiment, an output equal to 80% of the full-throttle output (output production rate: 80%) is set as the bag-fill determination point.

Figure 7:
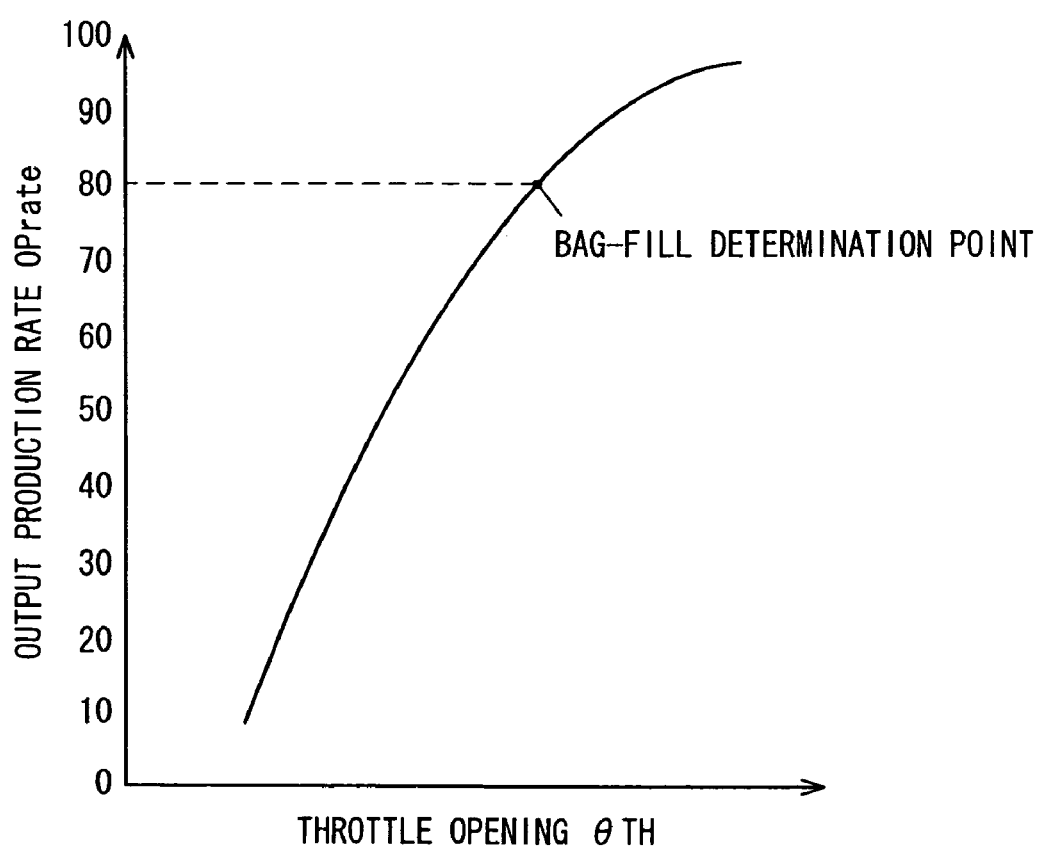
FIG. 7 is a graph showing the characteristics of the throttle opening in relation to the output production rate estimated by the process in the flowchart in FIG. 5.

FIG. 7 is a graph showing the characteristics of the throttle opening θTH in relation to the output production rate OPrate when the engine speed NE is equal to the desired speed NED (2900 rpm). It is possible to estimate the output production rate OPrate (roughly equal to the engine output OP) and to determine whether the estimated output production rate OPrate has exceeded the bag-fill determination point (output production rate 80%) by referring to the graph in FIG. 7 on the basis of the throttle opening θTH.

To describe the flowchart in FIG. 5 on the premise of the above description, first, the throttle opening θTH is detected in S10. Then, the system advances to S12, refers to the graph (map) shown in FIG. 7 on the basis of the throttle opening θTH, and estimates the engine output OP, that is, the output production rate OPrate.

The process subsequently advances to S14, where it is determined whether the estimated output production rate OPrate is equal to or greater than 80%, that is, whether the grass bag 36 is full. If the result of S14 is negative and the grass bag 36 is determined to not be full, the process advances to S16 and the bag-fill indicator lamp 22b is extinguished.

Conversely, if the outcome in S14 is positive and it is determined that the grass bag 36 is full, the process advances to S18, and a conclusion is made as to whether the determination that the grass bag 36 is full will hold for a specific time t1 (continually). This conclusion is made by starting a counter with a separate program (not shown) if the outcome in S14 is positive (if it is determined that the grass bag 36 is full), and confirming whether the counter value has reached the specific time t1 (for example, 1 sec).

If the outcome in S18 is positive, the process subsequently advances to S20 and the bag-fill indicator lamp 22b lights up to inform the operator. Specifically, the operator is prompted to stop cutting grass and to deal with (remove) the grass accumulated in the grass bag 36.

If the outcome in S18 is negative, the bag-fill indicator lamp 22b is extinguished in S16. The reason is that even when there is a temporary increase in the engine output OP (an accidental increase caused by fuel flooding or the like), this increase is prevented from being misinterpreted as an increase in engine output (filling up of the grass bag 36).

Thus, in this embodiment, the engine output OP, or, more specifically, the output production rate OPrate, is estimated based on the throttle opening θTH and the desired speed NED of the engine 18, the grass bag 36 is determined to be full of cut grass when the estimated output production rate OPrate exceeds a specific value (80%), and the bag-fill indicator lamp 22b is lit up to inform the operator when the grass bag 36 is determined to be full. Accordingly, the grass bag 36 can be detected to be full and the operator informed without providing a dedicated sensor, whereby the lawn mower can be made smaller and less expensive, and it is possible to prevent the engine 18 from stalling, the cut grass from clogging the space between the blade 32 and the glade housing, and other such drawbacks.

Also, it is possible to prevent unnecessary alerts resulting from a temporary increase in engine output (an accidental increase caused by fuel flooding or the like), because of a configuration wherein the grass bag 36 is determined to be full when the estimated output production rate OPrate exceeds a specific value (80%) over a specific period of time t1.

Figure 8:
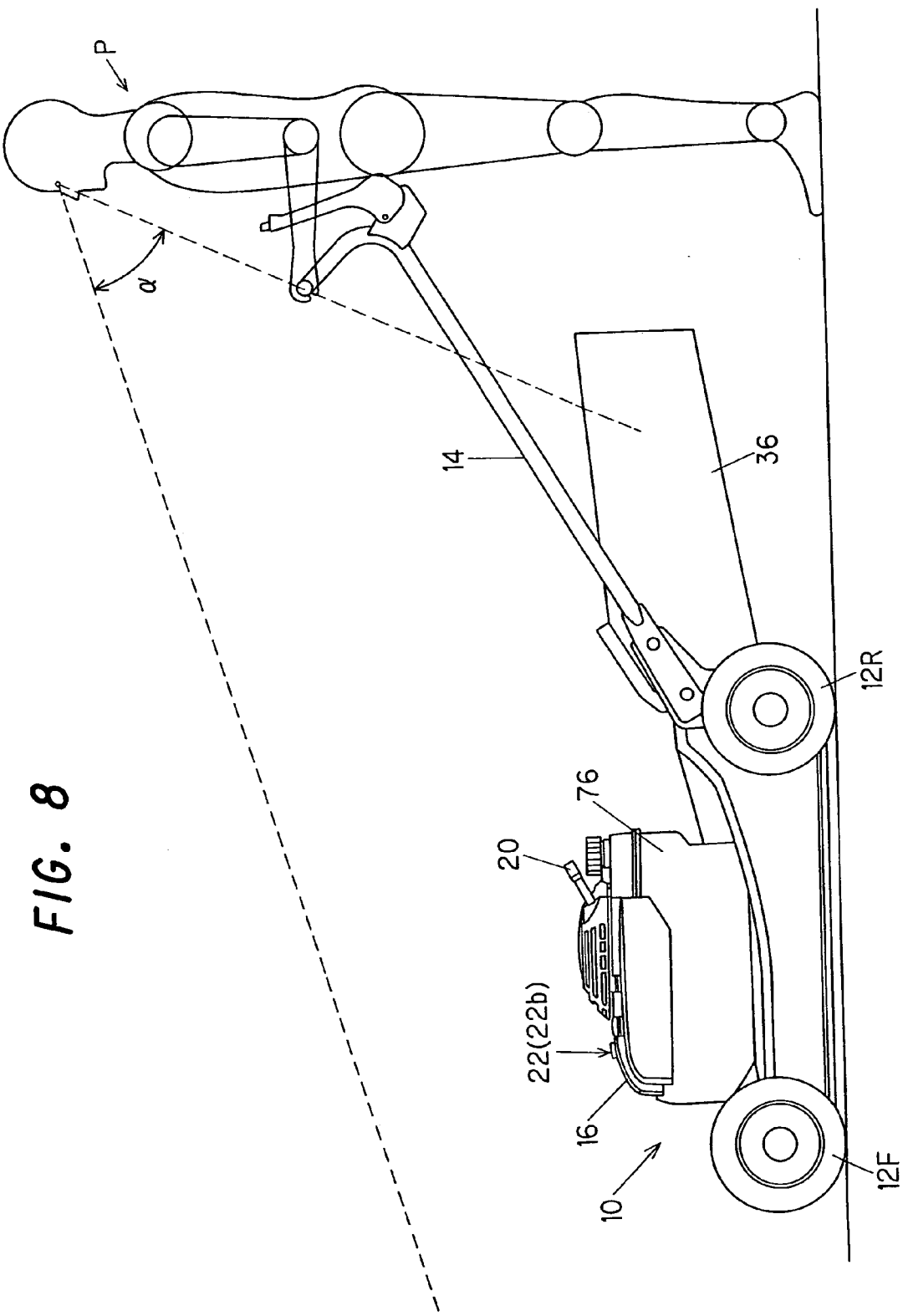
FIG. 8 is an explanatory diagram showing the relationship between the mounting position of the bag-fill indicator lamp shown in FIG. 1 and the field of vision of the operator.

Also, the operator can reliably confirm that the grass bag 36 is full and the occurrence of engine stalls and other such drawbacks can be more effectively prevented because of a configuration wherein a bag-fill indicator lamp 22b is disposed on top of the engine cover 16, or, more specifically, the bag-fill indicator lamp 22b is disposed at a position on the lawn mower 10 that is within the field of vision (shown by the angle α) of the operator (indicated by the symbol P; shown as a robot in order to indicate joint locations and the like) who is cutting grass, as shown in FIG. 8. Also, operability is improved because the operator can confirm that the grass bag 36 is full without looking away from the cutting location.

In the above description, the bag-fill indicator lamp 22b is lit up to provide a visible warning when it is determined that the grass bag 36 is full, but a buzzer or the like may also be sounded to provide an audible warning.

Figure 9:
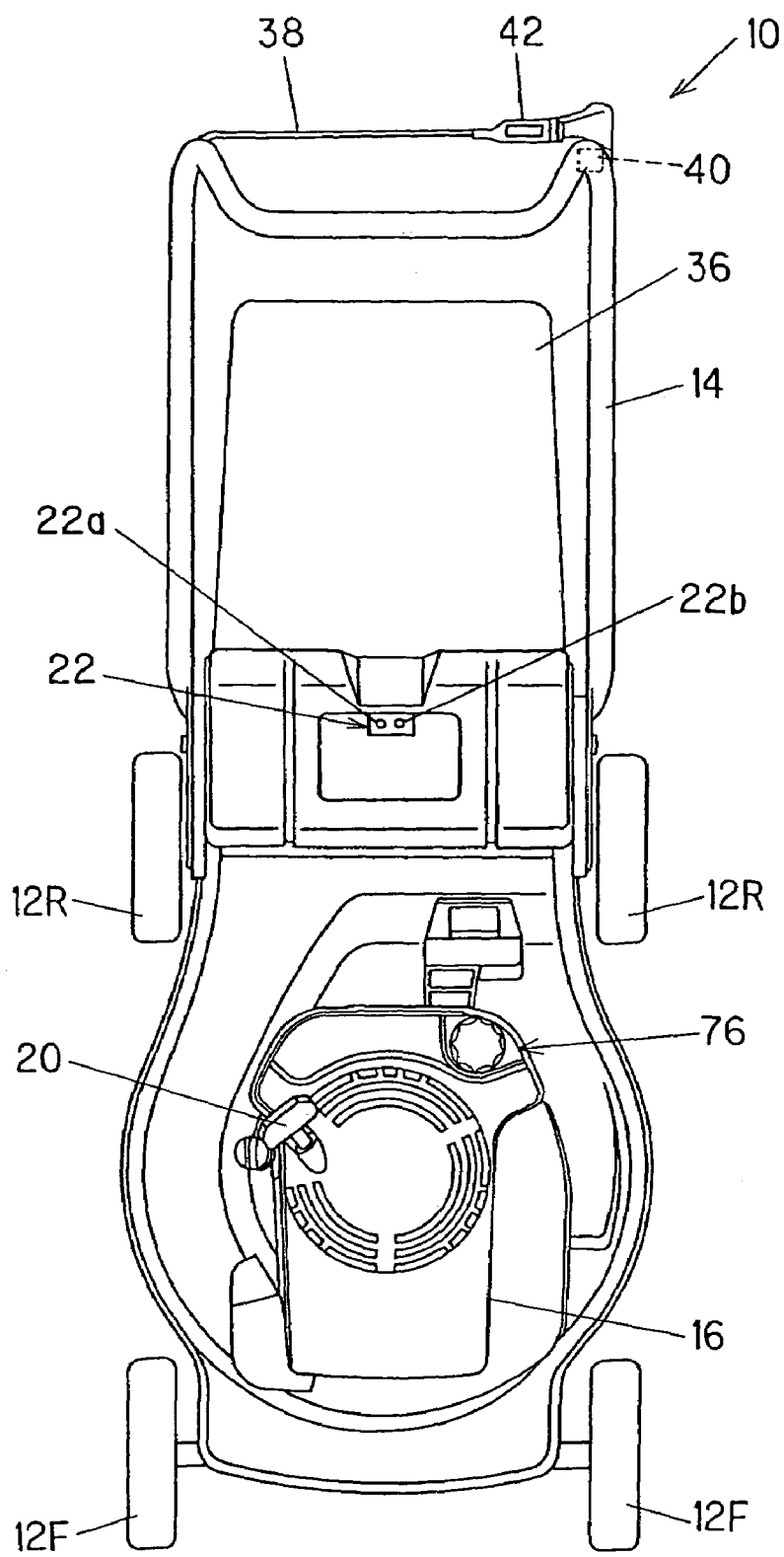
FIG. 9 is a plan view similar to FIG. 1, showing another example of the mounting position of the bag-fill indicator lamp shown in FIG. 1.
Figure 10:
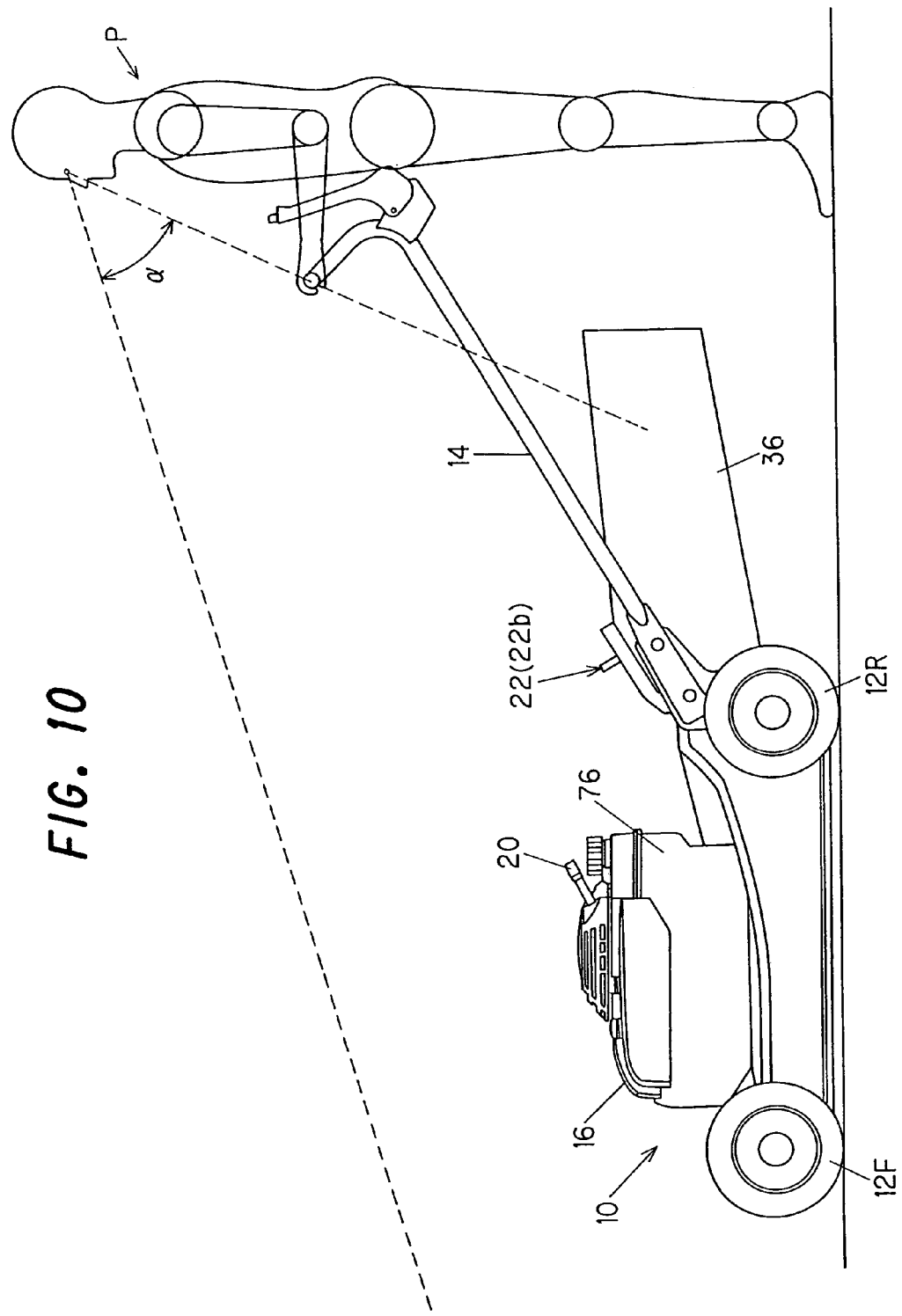
FIG. 10 is an explanatory diagram similar to FIG. 8, showing the relationship between the mounting position of the bag-fill indicator lamp shown in FIG. 9 and the field of vision of the operator.
Figure 11:
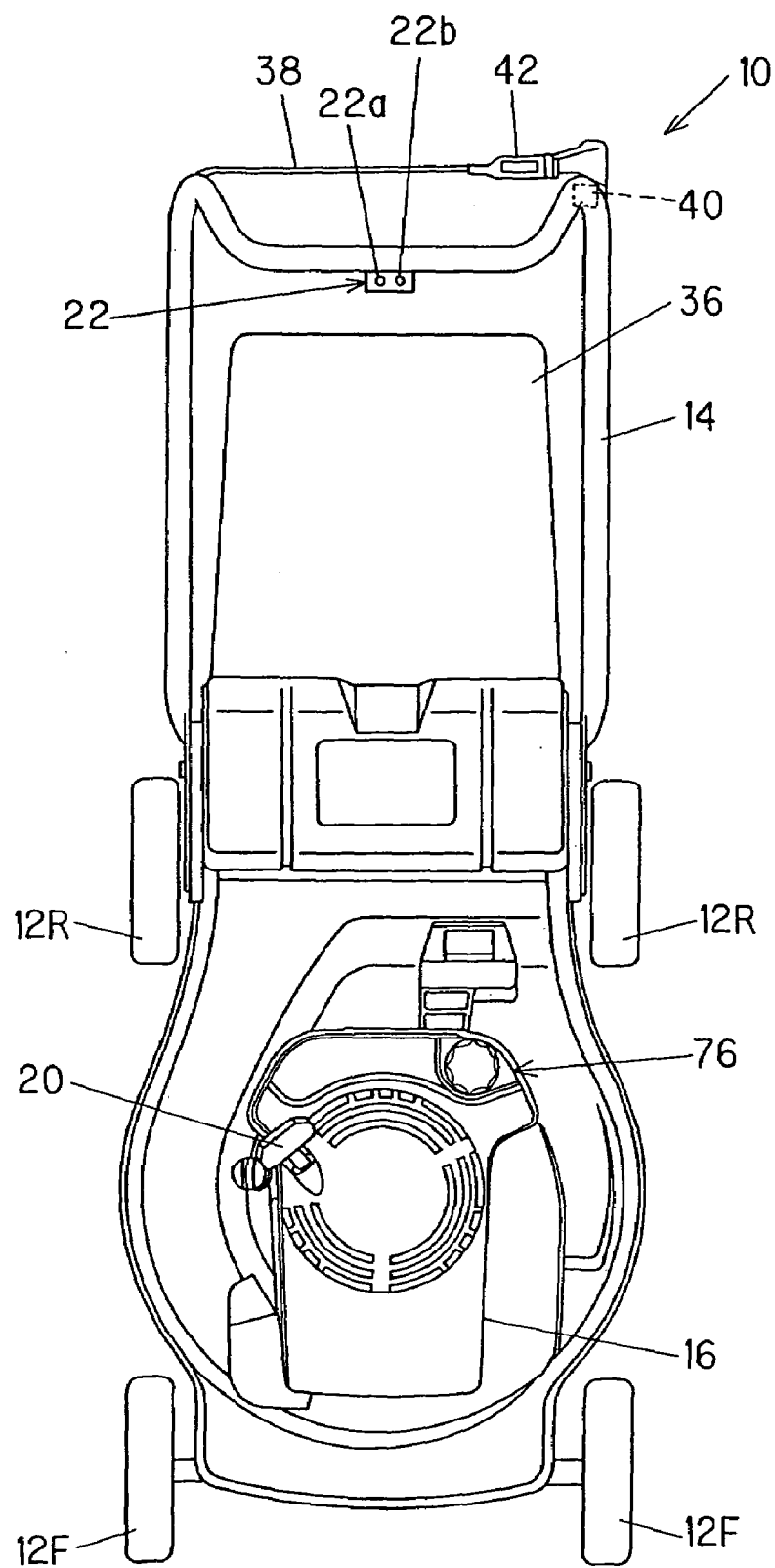
FIG. 11 is a plan view similar to FIG. 1, showing another example of the mounting position of the bag-fill indicator lamp shown in FIG. 1.
Figure 12:
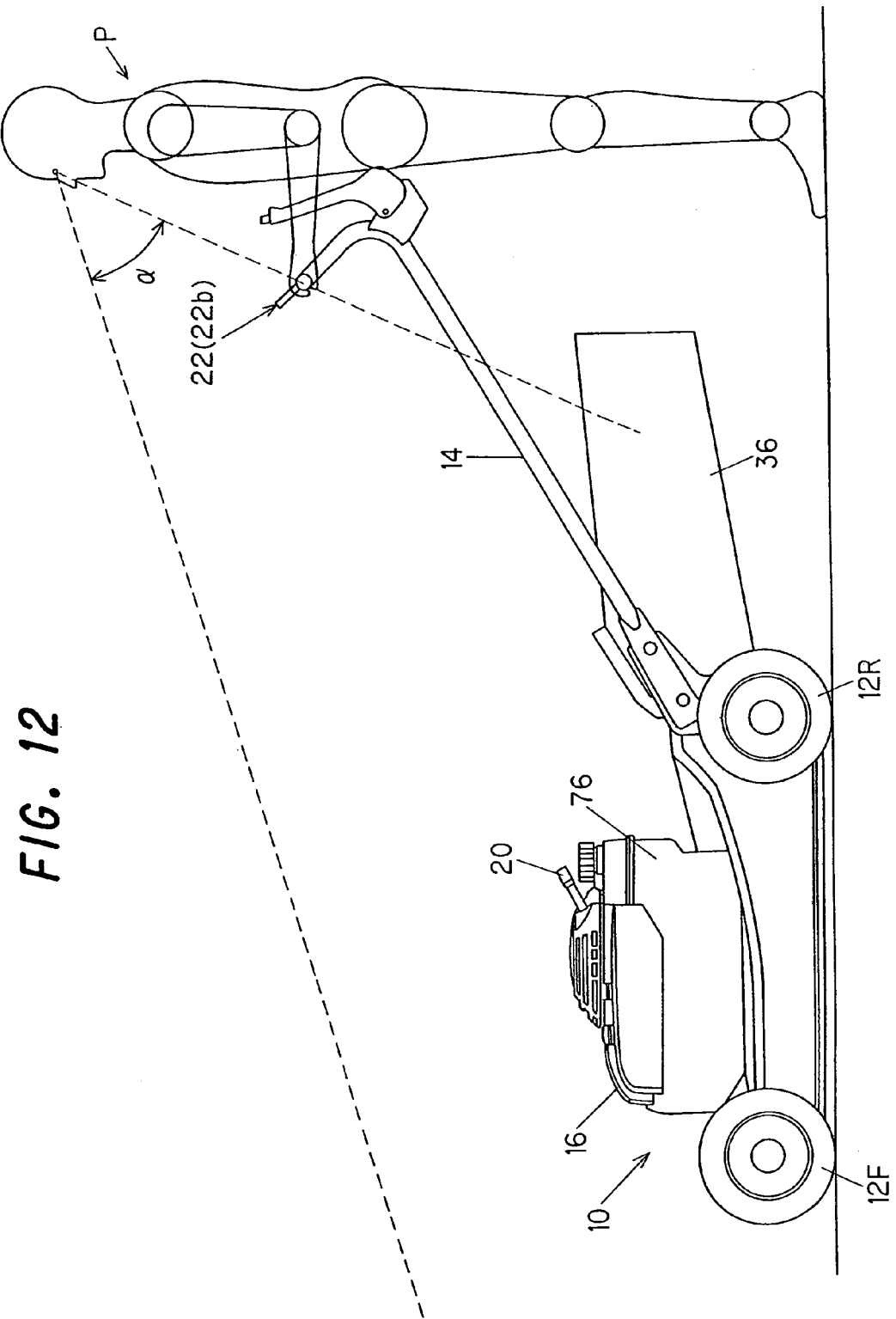
FIG. 12 is an explanatory diagram similar to FIG. 8, showing the relationship between the mounting position of the bag-fill indicator lamp shown in FIG. 11 and the field of vision of the operator.

Also, the bag-fill indicator lamp 22b may be mounted near the farthest back area of the frame of the lawn mower 10, as shown in FIGS. 9 and 10, or on the end portion of the handlebar 14 (the end portion toward the operator P), as shown in FIGS. 11 and 12. Specifically, the lamp may be mounted at any location on the lawn mower 10 as long as it is within the field of vision during operation.

Figure 13:
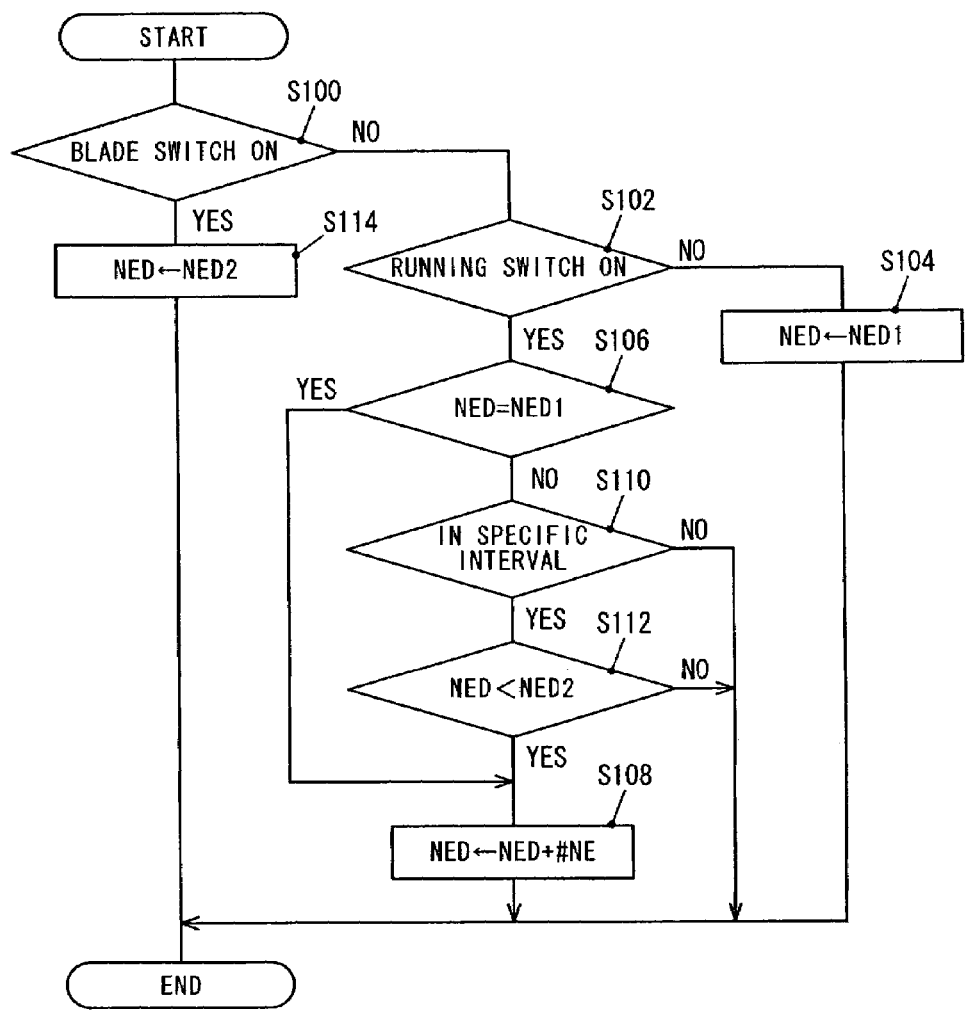
FIG. 13 is a flowchart showing another operation of the control system of the lawn mower shown in FIG. 1.

Next, another operation of the control system of the lawn mower according to this embodiment will be described with reference to FIG. 13. FIG. 13 is a flowchart showing this operation. The program shown in the diagram is performed in the ECU 82 with a prescribed cyclicity (for example, 20 msec).

According to the description that follows, it is first determined in S100 whether the blade switch 42 is outputting an "on" signal, that is, whether a drive instruction for the blade 32 is being inputted from the operator. If the outcome in S100 is negative, the process then advances to S102 and it is determined whether the running switch 40 is outputting an "on" signal, that is, whether a running instruction for the lawn mower 10 is being inputted from the operator.

If the outcome in S102 is negative, that is, when neither a drive instruction for the blade 32 nor a running instruction for the lawn mower 10 is inputted from the operator, the process then advances to S104 and the desired speed NED is set to a first desired speed NED1. As referred to herein, the first desired speed NED1 is the idling speed, and is 2000 rpm in this embodiment.

Conversely, if the outcome in S102 is positive, the process then advances to S106 and it is determined whether the current desired speed NED is equal to the aforementioned first desired speed NED1. If the outcome in S106 is positive, the process then advances to S108, and a value obtained by adding a specific speed #NE (100 rpm in this embodiment) to the current desired speed NED is set as the new desired speed NED.

If the outcome in S106 is negative, the process then advances to S110, and it is determined whether there is a specific interval. The term "specific interval" refers to the time interval that has elapsed since the desired speed NED was changed, and is set to 100 msec in this embodiment. If the outcome in S110 is positive, the process then advances to S112 and it is determined whether the desired speed NED is smaller than a second desired speed NED2. As referred to herein, the second desired speed NED2 is the desired value during operation and is set to a speed higher than the aforementioned first desired speed NED1 (2900 rpm in this embodiment).

If the outcome in S112 is positive, the process advances to S108, and a new desired speed NED is set by adding a specific speed #NE to the current desired speed NED (specifically, the first desired speed NED1), and the result is set as the new desired speed NED. If the outcome in S110 or S112 is negative, the subsequent processes are skipped. Also, if the outcome in S100 is positive, the process advances to S114, and the desired speed NED is set as the second desired speed NED2.

The above processes will now be described in detail with reference to FIGS. 14 through 17. FIGS. 14 through 17 are time charts showing the changes in the desired speed NED in relation to the output from the running switch 40 and the blade switch 42.

Figure 14:
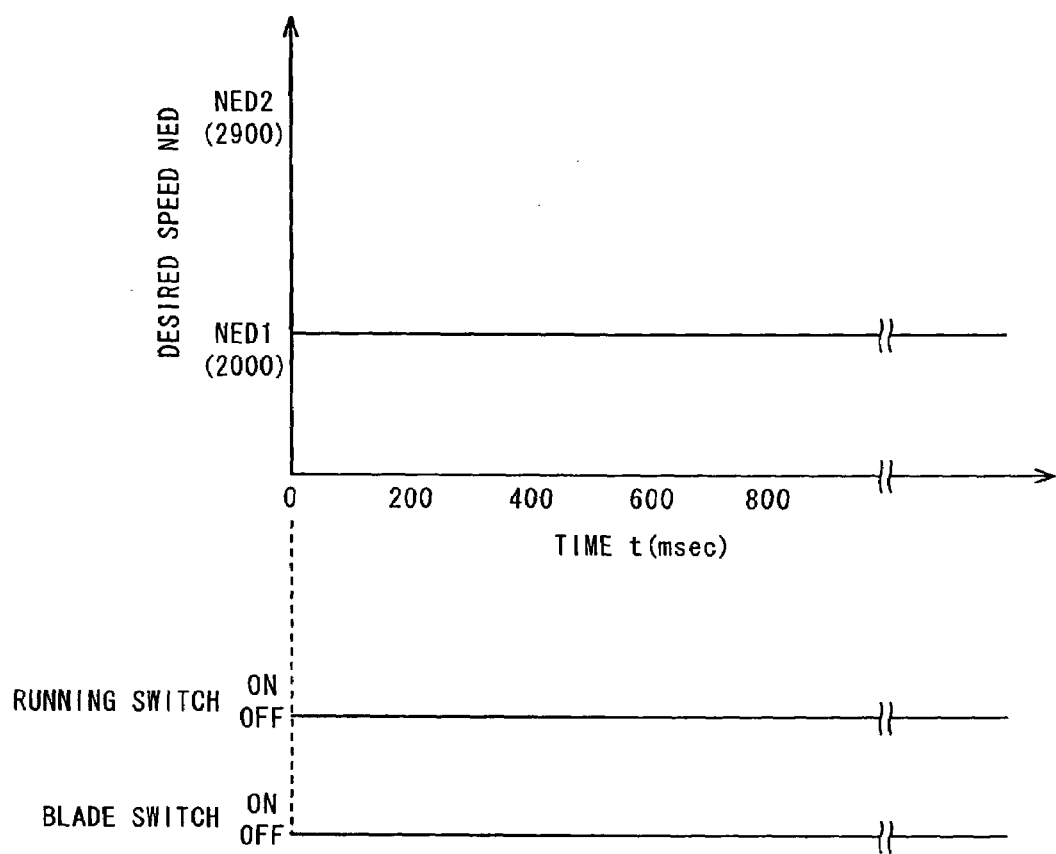
FIG. 14 is a time chart showing the change in the desired speed in relation to the output from the running switch and the blade switch shown in FIG. 1.

As shown in FIG. 14, the desired speed NED is kept unchanged at the first desired speed NED1, that is, the idling speed, if neither the running switch 40 nor the blade switch 42 is outputting an "on" signal, that is, if neither a drive instruction for the blade 32 nor a running instruction for the lawn mower 10 (more specifically, a drive instruction for the rear wheels 12R) is being inputted from the operator (if the outcome in S100 and S102 is negative in the flowchart in FIG. 13), as shown in the drawing.

Figure 15:
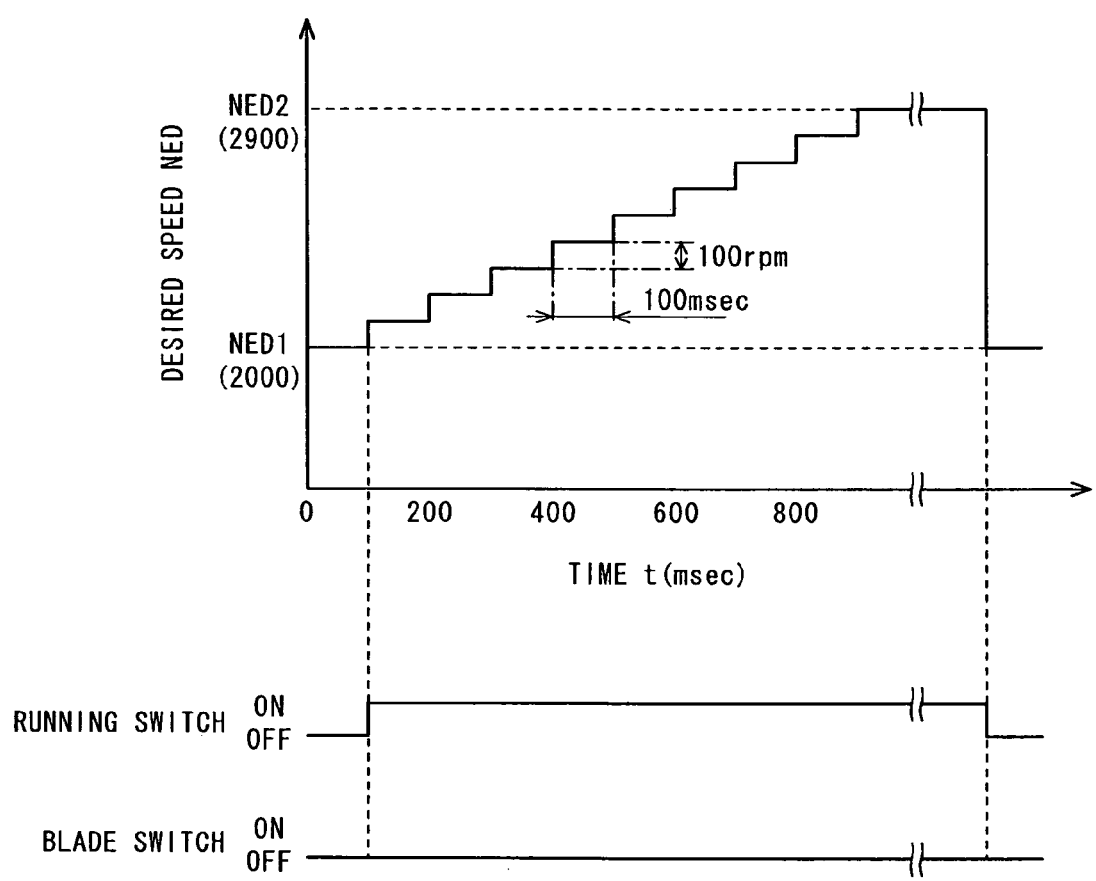
FIG. 15 is similarly a time chart showing the change in the desired speed in relation to the output from the running switch and the blade switch shown in FIG. 1.

The desired speed NED is allowed to increase by a specific speed #NE (100 rpm) at specific intervals (100 msec intervals), as shown in FIG. 15, when only the running switch 40 is outputting an "on" signal, that is, when a running instruction for the lawn mower 10 is being inputted from the operator (when a positive outcome is obtained in S102 after a negative outcome is obtained in S100 in the flowchart in FIG. 13). In other words, the desired speed NED gradually increases from the first desired speed NED1 to the second desired speed NED2. Also, when the running switch 40 no longer outputs an "on" signal, that is, when the running instruction for the lawn mower 10 from the operator is terminated (if the outcome in S102 is negative in the flowchart in FIG. 13), the desired speed NED immediately decreases from the second desired speed NED2 to the first desired speed NED1.

Figure 16:
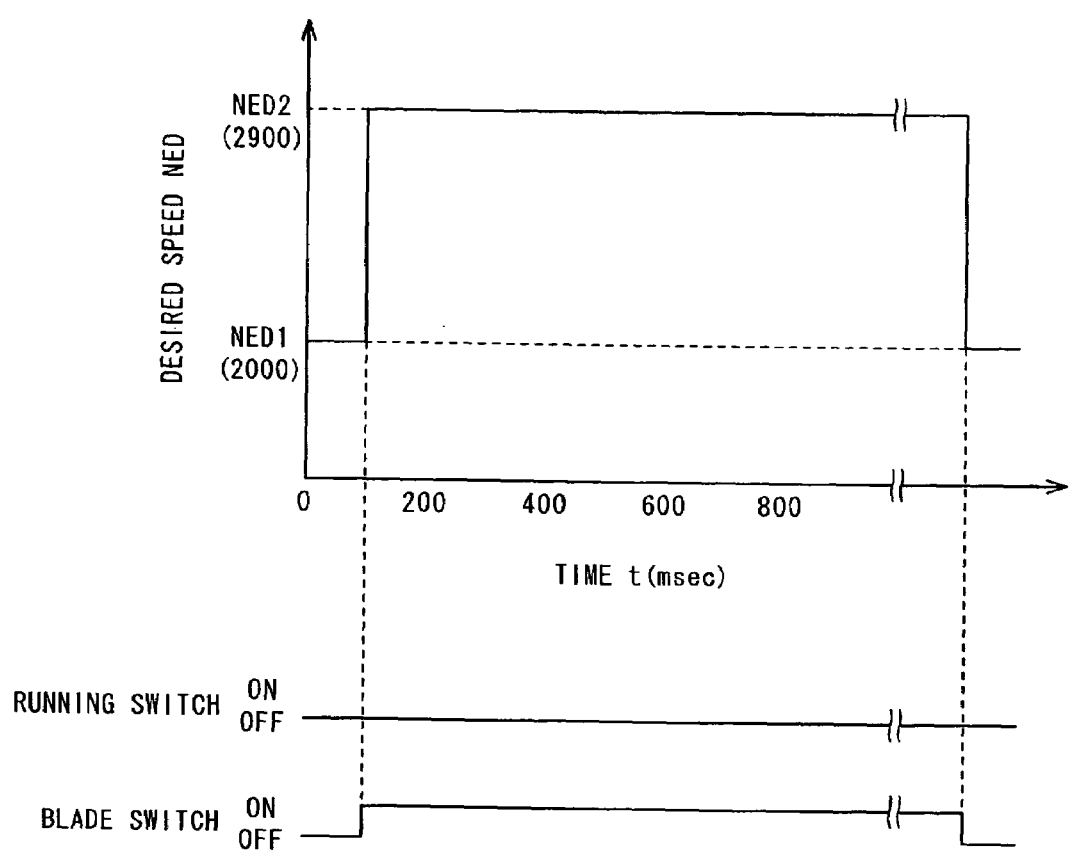
FIG. 16 is similarly a time chart showing the change in the desired speed in relation to the output from the running switch and the blade switch shown in FIG. 1.

By contrast, the desired speed NED is immediately changed from the first desired speed NED1 to the second desired speed NED2, as shown in FIG. 16, if only the blade switch 42 is outputting an "on" signal, that is, if a drive instruction for the blade 32 is being inputted from the operator (if the outcome in S100 is positive in the flowchart in FIG. 13). Also, if the blade switch 42 no longer outputs an "on" signal, that is, if the drive instruction for the blade 32 from the operator is terminated (if the outcome in S100 and S102 is negative in the flowchart in FIG. 13), the desired speed NED immediately decreases from the second desired speed NED2 to the first desired speed NED1.

In this embodiment, the first desired speed NED1 is set to 2000 rpm, the second desired speed NED2 is set to 2900 rpm, the specific interval is set to 100 msec, and the specific speed #NE is set to 100 rpm; therefore, 900 msec is needed for the speed to increase from the first desired speed NED1 to the second desired speed NED2.

Figure 17:
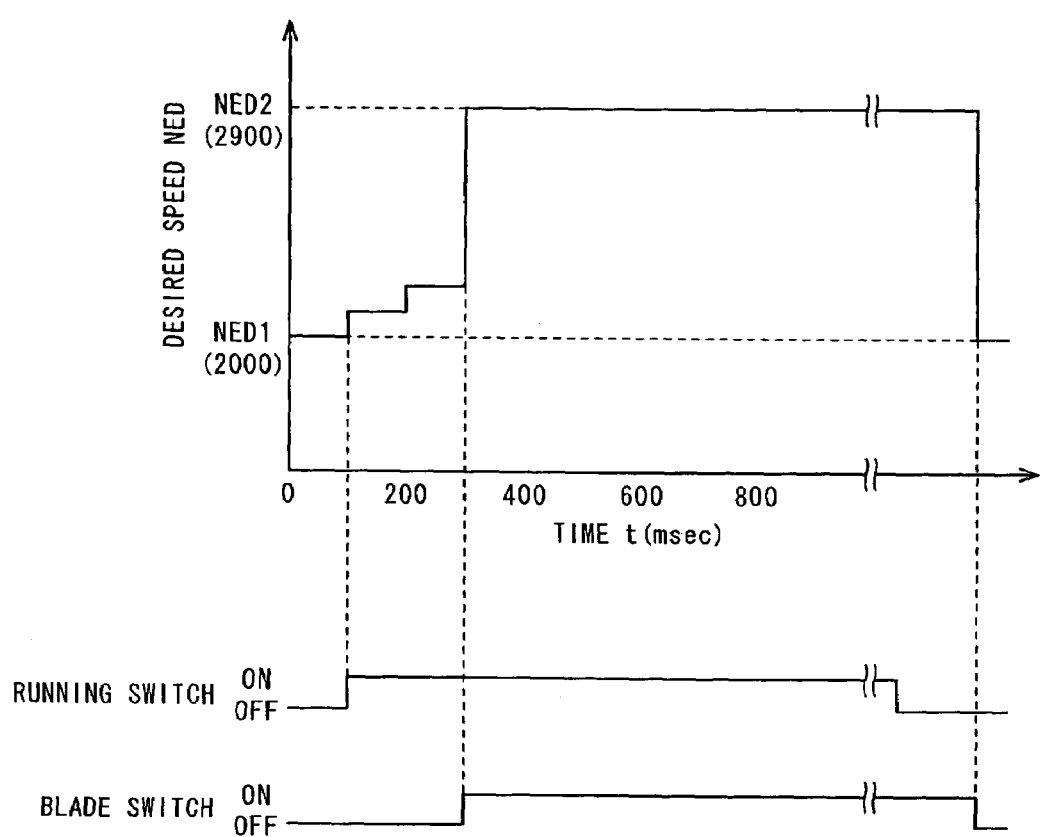
FIG. 17 is similarly a time chart showing the change in the desired speed in relation to the output from the running switch and the blade switch shown in FIG. 1.

Also, after a running instruction for the lawn mower 10 is inputted by the operator via the running switch 40, and furthermore when a drive instruction for the blade 32 has been inputted via the blade switch 42, that is, when both the running instruction for the lawn mower 10 and the drive instruction for the blade 32 have been inputted, the drive instruction for the blade 32 is given priority and the desired speed NED immediately increases to the second desired speed NED2, as shown in FIG. 17. When both the running instruction for the lawn mower 10 and the drive instruction for the blade 32 have been inputted, the desired speed NED is kept at the second desired speed NED2 until both commands are terminated.

Thus, a blade switch 42 for inputting a drive instruction for the blade 32 and a running switch 40 for inputting a running instruction for the lawn mower 10 are provided in this embodiment, and the desired speed NED is changed based on the drive instruction for the blade 32 and the running instruction for the lawn mower 10. More specifically, the arrangement is such that when neither the drive instruction for the blade 32 nor the running instruction for the lawn mower 10 has been inputted, the desired speed NED is set to the first desired speed NED1 (idling speed); when the drive instruction for the blade 32 is inputted, the desired speed NED is immediately increased to a second desired speed NED2 (desired speed during operation) above the first desired speed NED1; and when the running instruction for the lawn mower 10 is inputted, the desired speed NED is gradually increased from the first desired speed NED1 to the second desired speed NED2. Therefore, the engine speed NE can be varied with separate consideration for the driving of the wheels (rear wheels 12) and the driving of the blade 32, whereby fuel efficiency and operability can be improved.

A configuration is also provided wherein the desired speed NED gradually increases when the running instruction for the lawn mower 10 is inputted, so sudden accelerations can be prevented when the lawn mower 10 enters the self-propelled mode, resulting in better maneuverability.

A configuration is further provided wherein the desired speed NED immediately increases from the first desired speed NED1 to the second desired speed NED2 when the both the drive instruction for the blade 32 and the running instruction for the lawn mower 10 have been inputted, so grass can be cut quickly, resulting in even better operability.

A configuration is additionally provided wherein the desired speed NED is immediately reduced from the second desired speed NED2 to the first desired speed NED1 when both the drive instruction for the blade 32 and the running instruction for the lawn mower 10 are terminated, that is, when there is no need to increase the engine speed NE, so both fuel efficiency and operability can be improved with even greater efficiency.

Thus, the embodiment is configured to have a system for controlling operation of a lawn mower 10 having an internal combustion engine 18, a grass-cutting blade 32 connected to the engine to be driven to cut grass and a grass bag 36 to collect grass cut by the blade, comprising: an actuator (electric motor 72) that opens/closes a throttle valve 70 of the engine; an engine speed controller (ECU 82) that controls operation of the actuator such that a speed of the engine NE becomes a desired engine speed NED; a throttle-position sensor 79 that outputs a signal indicative of a position of the throttle valve; an engine output estimator (ECU 82, S12) that estimates output of the engine (OP; more precisely output production rate OPrate) based on the detected position of the throttle valve and the desired engine speed; a bag-full determiner (ECU 82, S14) that determines that the grass bag is full of cut grass when the estimated output of the engine exceeds a prescribed value; and an informing device (bag-fill indicator lamp 22b) that informs an operator when the grass bag is determined to be full. The informing device is an indicator disposed at a position on the lawn mower 10 that is within a field of vision of the operator, and the indicator is, more specifically, a lamp.

The embodiment is further configured to have a system for controlling operation of a lawn mower 10 having an internal combustion engine 18, a grass-cutting blade 32 connected to the engine to be driven to cut grass and a wheel 12F, 12R, more precisely 12R connected to the engine to be driven to run the lawn mower, comprising: an actuator (electric motor 72) that opens/closes a throttle valve of the engine; an engine speed controller (ECU 82) that controls operation of the actuator such that a speed of the engine NE becomes a desired engine speed NED; a blade switch 42 that inputs a drive instruction to drive the blade; a running switch 40 that inputs a running instruction to run the lawn mower; a desired engine speed changer (ECU 82, S104, S114, S108–S112) that sets the desired engine speed NED to a first desired speed NED1 when neither the drive instruction nor the running instruction is inputted, changes the desired engine speed immediately to a second speed NED2, set higher than the first speed, when the drive instruction is inputted, while changes the desired engine speed to the second speed gradually, when the running instruction is inputted.

In the system, desired engine speed changer changes the desired engine speed NED to the second speed NED2 immediately, when both the drive instruction and the running instruction are inputted, whilst the desired engine speed changer changes the desired engine speed to the first speed NED1 immediately, when both the drive instruction and the running instruction are terminated.

In the above descriptions, the numerical values of the first desired speed NED1, the second desired speed NED2, the specific interval, and the specific speed #NE were specifically indicated, but it is apparent that these values are nonlimiting.

Also, a stepping motor was used as the actuator for opening and closing the throttle valve 70, but a DC motor, a rotary solenoid, or another such actuator may also be used.

Japanese Patent Application Nos. 2003-333710 and 2003-333711, both filed on Sep. 25, 2003, are incorporated herein by reference in their entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling operation of a lawn mower having an internal combustion engine, a grass-cutting blade connected to the engine to be driven to cut grass and a grass bag to collect grass cut by the blade, comprising:
    an actuator that opens/closes a throttle valve of the engine;
    an engine speed controller that controls operation of the actuator such that a speed of the engine becomes a desired engine speed;
    a throttle-position sensor that outputs a signal indicative of a position of the throttle valve;
    an engine output estimator that estimates output of the engine based on the detected position of the throttle valve and the desired engine speed;
    a bag-full determiner that determines that the grass bag is full of cut grass when the estimated output of the engine exceeds a prescribed value; and
    an informing device that informs an operator when the grass bag is determined to be full.

2. The system according to claim 1, wherein the informing device is a visible indicator disposed at a position on the lawn mower that is within a field of vision of an operator.

3. The system according to claim 2, wherein the indicator is a lamp.

4. The system according to claim 1, further comprising:
    a blade switch that inputs a drive instruction to drive the blade;
    a running switch that inputs a running instruction to propel the lawn mower; and
    a desired engine speed changer that sets the desired engine speed to a first desired speed when neither the drive instruction nor the running instruction is inputted, changes the desired engine speed immediately to a second speed, set higher than the first speed, when the drive instruction is inputted, and changes the desired engine speed to the second speed gradually, when the running instruction is inputted.

5. A method of controlling operation of a lawn mower having an internal combustion engine, a grass-cutting blade connected to the engine to be driven to cut grass, a grass bag to collect grass cut by the blade and an actuator that opens/closes a throttle valve of the engine, comprising the steps of:
    controlling operation of the actuator such that a speed of the engine becomes a desired engine speed;
    detecting a position of the throttle valve;
    estimating output of the engine based on the detected position of the throttle valve and the desired engine speed;
    determining that the grass bag is full of cut grass when the estimated output of the engine exceeds a prescribed value; and
    informing an operator by an informing device when the grass bag is determined to be full.

6. The method according to claim 5, wherein the informing device is a visible indicator disposed at a position on the lawn mower that is within a field of vision of the operator.

7. The method according to claim 6, wherein the indicator is a lamp.

8. The method according to claim 5, further comprising the steps of:
    inputting a drive instruction to drive the blade;
    inputting a running instruction to propel the lawn mower;
    setting the desired engine speed to a first speed when neither the drive instruction nor the running instruction is inputted, changing the desired engine speed immediately to a second speed, set higher than the first speed, when the drive instruction is inputted, and changing the desired engine speed to the second speed gradually, when the running instruction is inputted.

* * * * *